US010224984B1

(12) United States Patent
Li et al.

(10) Patent No.: US 10,224,984 B1
(45) Date of Patent: Mar. 5, 2019

(54) ELECTRONIC DEVICE AND CERAMIC BACK COVER USED IN ELECTRONIC DEVICE

(71) Applicant: Shenzhen Sunlord Electronics Co., Ltd., Shenzhen, Guangdong (CN)

(72) Inventors: Youyun Li, Guangdong (CN); Yanjun Zhu, Guangdong (CN)

(73) Assignee: Shenzhen Sunlord Electronics Co., Ltd., Shenzhen (CN)

( * ) Notice: Subject to any disclaimer, the term of this patent is extended or adjusted under 35 U.S.C. 154(b) by 0 days.

(21) Appl. No.: 15/912,503

(22) Filed: Mar. 5, 2018

Related U.S. Application Data (63) Continuation of application No. PCT/CN2018/070107, filed on Jan. 3, 2018.

(51) Int. Cl.
  *H02J 50/10*  (2016.01)
  *H04B 5/00*  (2006.01)
  *H02J 7/02*  (2016.01)

(52) U.S. Cl.
  CPC ............ *H04B 5/0037* (2013.01); *H02J 7/025* (2013.01)

(58) Field of Classification Search
  CPC ................................ H04B 5/0037; H02J 7/025
  See application file for complete search history.

(56) References Cited

U.S. PATENT DOCUMENTS

| 2013/0169223 | A1* | 7/2013 | Lee ........................ H02J 7/0042 320/108 |
| 2015/0137742 | A1 | 5/2015 | Tseng et al. |
| 2016/0261026 | A1* | 9/2016 | Han ........................ H01Q 1/243 |
| 2017/0296104 | A1* | 10/2017 | Ryan ....................... A61B 5/1118 |
| 2018/0157411 | A1* | 6/2018 | Kim ........................ G06K 9/0004 |

FOREIGN PATENT DOCUMENTS

| CN | 102544615 A | 7/2012 |
| CN | 104880940 A | 9/2015 |
| CN | 105163539 A | 12/2015 |
| CN | 107360277 A | 11/2017 |

\* cited by examiner

*Primary Examiner* — Tuan H Nguyen (57) ABSTRACT

Disclosed is a ceramic back cover used in an electronic device and an electronic device having the ceramic back cover. A wireless charging RX coil is disposed on an inner surface of the ceramic back cover, a groove used for disposing the wireless charging RX coil is in an intermediate region of the inner surface of the ceramic back cover, and at least two wireless charging RX electrode grooves that extend outward separately from an intermediate region of the groove and a marginal region of the groove are formed on the inner surface of the ceramic back cover. Electrodes formed in the at least two wireless charging RX electrode grooves are used as leading-out ends of the wireless charging RX coil disposed in the groove, and two ends of the wireless charging RX coil are welded at the leading-out ends.

10 Claims, 7 Drawing Sheets

ELECTRONIC DEVICE AND CERAMIC BACK COVER USED IN ELECTRONIC DEVICE

CROSS REFERENCE TO RELATED APPLICATIONS

This application is a continuation application of PCT application No. PCT/CN2018/070107 filed on Jan. 3, 2018. The contents of the above-mentioned application are all hereby incorporated by reference.

BACKGROUND OF THE INVENTION

Field of the Invention

The present invention relates to a shell structure of an electronic device and a component of the electronic device, and in particular, to a ceramic back cover used in an electronic device and an electronic device.

Related Arts

As a portable electronic device such as a smartphone, a tablet computer, or a wearable device is widely and highly frequently used, a charging requirement growing higher. Especially, the smartphone has powerful functions, rich software, and high use frequency, causing large power consumption of the phone and a short standby time. These products need to be charged repeatedly, which is bothersome in practice.

In an existing portable electronic device such as a smartphone, a tablet computer, and a wearable device, a main antenna, an NFC antenna, and a wireless charging receiving coil (RX coil) are not integrated on one component. Instead, an LDS antenna is first fixed on a plastic support by using screws. This not only increases the thickness of the product, but also increases a manufacture process of the product. In another portable electronic device such as a smartphone, a tablet computer, and a wearable device, a metal frame and a metal back cover are generally used for fashion. The metal frame and the metal back cover may affect signal transmission. Therefore, the metal frame and the metal back cover need to be segmented into three parts to be connected by using plastic. This has large machining difficulty, many procedures, and high costs. The quality cannot be ensured, and the yield is low.

In an existing wireless charging device, generally, a wireless charging coil and a magnetic plate are adhered to be fixed on a back cover of a battery for use. This occupies inner space of the product, and does not help miniaturize and thin an electronic product. In the structure of the existing wireless charging coil, generally, a wire of the coil is first wrapped, and a leading-out end of one end of the wire needs to be pressed on the coil. This increases the thickness of the coil. The thickness of the entire coil is doubled, which does not help miniaturize and thin the electronic product.

When the wireless charging device is used to charge an electronic device such as a mobile phone, the mobile phone is not connected to the wireless charging device by using a wire, but can be charged by being simply put on the wireless charging device, and can be taken away for use at any time. The wireless charging device is not limited by a connection wire of a conventional mobile phone, can be charged conveniently and flexibly, and has advantages such as charging multiple electrical apparatuses at the same time. However, when the existing wireless charging device is charging, there is still a problem of unsatisfactory wireless charging efficiency.

The disclosure of the foregoing background is only used to help understand the inventive concept and technical solution of the present invention, and does not necessarily belong to the prior art of this application. Unless there is clear evidence that the foregoing content has been disclosed at the application date of this application, the foregoing background shall not be used to evaluate novelty and creativity of this application.

SUMMARY

A main objective of the present invention is directed to provide a ceramic back cover used in an electronic device and an electronic device for the disadvantage of the prior art, to help miniaturize and thin an electronic product, and improve the wireless charging efficiency.

To achieve the foregoing objective, the following technical solutions are used in the present disclosure.

A ceramic back cover used in an electronic device is provided, where a wireless charging RX coil is disposed on an inner surface of the ceramic back cover, a groove used for disposing the wireless charging RX coil is in an intermediate region of the inner surface of the ceramic back cover, and at least two wireless charging RX electrode grooves that extend outward separately from an intermediate region of the groove and a marginal region of the groove are formed on the inner surface of the ceramic back cover, where electrodes formed in the at least two wireless charging RX electrode grooves are used as leading-out ends of the wireless charging RX coil disposed in the groove, and two ends of the wireless charging RX coil are welded at the leading-out ends.

Further, the thickness of the ceramic back cover is 0.35 mm to 0.55 mm, the depth of the grooves is 0.1 mm to 0.2 mm, and the depth of the wireless charging RX electrode grooves is 0.1 mm to 0.2 mm.

The groove is a circular groove or a square groove or a racetrack groove; and preferably, electroplating or immersion gold processing is performed on the surface of the groove, and the wireless charging RX coil whose surface is coated with rubber is fixed in the groove.

The material of the ceramic back cover is a zirconium oxide structure ceramic or an aluminum oxide structure ceramic.

A main antenna and an NFC antenna of the electronic device are further disposed on the inner surface of the ceramic back cover, and at least two electrode grooves of the NFC antenna are formed on the ceramic back cover, where electrodes formed in the at least two electrode grooves of the NFC antenna are used as leading-out ends disposed in the NFC antenna; and preferably, the depth of the electrode grooves of the NFC antenna is 0.1 mm to 0.2 mm.

The NFC antenna is disposed around the groove used for disposing the wireless charging RX coil.

The wireless charging RX electrode grooves are etched on the inner surface of the ceramic back cover; preferably, an electrode slurry used for forming the electrodes includes the mass percentage of silver content 60% to 95% and glass dust content 5% to 40%; preferably, the sintering temperature of silver ink firing performed on the electrode slurry is 600° C. to 950° C.; preferably, electroplating or immersion gold processing is performed on the surface of the electrodes, and insulation processing is performed on the surface of the electrodes; and preferably, silk printing or pad printing or 3D printing is performed on the ceramic back cover to form the leading-out ends of the wireless charging RX coil.

The wireless charging RX electrode grooves and the electrode grooves of the NFC antenna are etched on the inner surface of the ceramic back cover; preferably, an electrode slurry used for forming the electrodes includes the mass percentage of silver content 60% to 95% and glass dust content 5% to 40%; preferably, the sintering temperature of silver ink firing performed on the electrode slurry is 600° C. to 950° C.; preferably, electroplating or immersion gold processing is performed on the surface of the electrodes, and insulation processing is performed on the surface of the electrodes; and preferably, silk printing or pad printing or 3D printing is performed on the ceramic back cover to form the leading-out ends of the wireless charging RX coil, the main antenna, the NFC antenna, and the leading-out ends of the NFC antenna.

A magnetic plate covering the wireless charging RX coil is further included; and preferably, the magnetic plate further covers the NFC antenna disposed around the groove.

An electronic device is provided and includes the ceramic back cover used in an electronic device.

The present invention has the following beneficial effects.

In the past, because a leading-out end of one end of a wire is generally pressed on the coil after the wire in the wireless charging coil structure in the existing wireless charging device is wrapped, the coil is thick. The present invention resolves this problem. In the present invention, a groove is disposed in an intermediate region of an inner surface of a ceramic back cover, a wireless charging RX coil is disposed in the groove, and wireless charging RX electrode grooves that extend outward separately from an intermediate region of the groove and a marginal region of the groove are formed on the inner surface of the ceramic back cover. Electrodes formed in the wireless charging RX electrode grooves are used as leading-out ends of the wireless charging RX coil disposed in the groove, and two ends of the wireless charging RX coil are welded at the leading-out ends to play a conduction role. The formed electrodes are used as the leading-out ends of the wireless charging RX coil, and the wire of the wireless charging RX coil does not need to be pressed on the coil. Instead, ends of the coil can be spot welded at the leading-out ends, to overcome the disadvantage that the wireless charging coil in the prior art occupies inner space of the product. The ceramic back cover is directly used as a back cover of a portable electronic product such as a smartphone, a tablet computer, or a wearable device. This helps miniaturize and thin the electronic product.

According to preferred solutions of the present disclosure, a body, a main antenna, an NFC antenna, and a wireless charging RX coil of a ceramic back cover are integrated according to the manner of the present disclosure. Compared with the existing structure in which a wireless charging RX coil and a magnetic plate are adhered to be fixed on a back cover of a battery, the wireless charging RX coil in the present disclosure has higher efficiency in heat dissipation by using the ceramic back cover, and has higher wireless charging efficiency.

In the present disclosure, the ceramic back cover, the main antenna, the NFC antenna, and the wireless charging RX coil are organically combined to implement integration. The good toughness and delicate jade sense of the ceramic back cover are used to achieve a good decoration effect. Different from the metal back cover of the existing electronic product, the present disclosure does not need a plastic support, and can be implemented by using a simple process that does not involve segmented manufacturing, because the ceramic back cover does not affect signal transmission as the metal frame or metal back cover does. If the present disclosure is applied to a portable electronic device such as a smartphone, a tablet computer, or a wearable device by using a metal frame, the entire metal frame may be used without segmenting the metal frame into parts and then connecting the parts by using plastic. The present disclosure can be simply processed, and has fewer procedures and lower costs. The quality can be ensured, and the yield is higher.

The features and technical advantages of the present disclosure have been described widely above, so as to better understand the detailed description of the present disclosure. Other features and advantages of the present disclosure are described below.

DETAILED DESCRIPTION

The present disclosure is described in further detail below with reference to embodiments and the accompanying drawings. It should be noted that, the following description is only for example, but not for limiting the scope and application of the present invention. A person skilled in the art should understand that, the disclosed concept and specific embodiments may be easily used as the basis for modifying or designing other structures to complete the same objective of the present invention. A person skilled in the art should also understand that, this equivalent construction does not depart from the spirit and scope of the present invention. The novelty feature that is considered as the characteristic of the present invention, the structure and running method of the present invention, and further objectives and advantages can be better understood from the following description and with reference to the accompanying drawings. However, it should be deeply understood that each provided feature is only for description and illustration, but not intended to limit the definition of the present invention.

Referring to FIG. 1 to FIG. 7, in an embodiment, a ceramic back cover 1 used in an electronic device is provided. A wireless charging RX coil 8 is disposed on an inner surface of the ceramic back cover 1, a groove 2 used for disposing the wireless charging RX coil 8 is in an intermediate region of the inner surface of the ceramic back cover 1, and at least two wireless charging RX electrode grooves 3 that extend outward separately from an intermediate region of the groove 2 and a marginal region of the groove 2 are formed on the inner surface of the ceramic back cover 1. Electrodes formed in the at least two wireless charging RX electrode grooves 3 are used as leading-out ends 5 of the wireless charging RX coil 8 disposed in the groove 2, and two ends of the wireless charging RX coil 8 are welded at the leading-out ends 5.

The inner surface of the ceramic back cover in this specification is one surface of the ceramic back cover toward an inner side of the electronic device.

In some embodiments, the ceramic back cover 1 may be, but not limited to, a back cover of a mobile phone with a camera 10.

In a preferred embodiment, the thickness of the ceramic back cover 1 is 0.35 mm to 0.55 mm, the depth of the groove 2 is 0.1 mm to 0.2 mm, and the depth of the wireless charging RX electrode grooves 3 is 0.1 mm to 0.2 mm.

In a preferred embodiment, the groove 2 is a circular groove 2 or a square groove 2 or a racetrack groove 2; and preferably, electroplating or immersion gold processing is performed on the surface of the groove 2, and the wireless charging RX coil 8 whose surface is coated with rubber is fixed in the groove 2.

In a preferred embodiment, the material of the ceramic back cover 1 is a zirconium oxide structure ceramic or an aluminum oxide structure ceramic.

In a preferred embodiment, a main antenna 6 and an NFC antenna 7 of the electronic device are further disposed on the inner surface of the ceramic back cover 1, and at least two electrode grooves 4 of the NFC antenna are formed on the ceramic back cover 1. Electrodes formed in the at least two electrode grooves 4 of the NFC antenna are used as leading-out ends disposed in the NFC antenna 7; and preferably, the depth of the electrode grooves of the NFC antenna 7 is 0.1 mm to 0.2 mm.

In a preferred embodiment, the NFC antenna 7 is disposed around the groove 2 used for disposing the wireless charging RX coil 8.

In a preferred embodiment, the wireless charging RX electrode grooves 3 are etched on the inner surface of the ceramic back cover 1; preferably, an electrode slurry used for forming the electrodes includes the mass percentage of silver content 60% to 95% and glass dust content 5% to 40%; preferably, the sintering temperature of silver ink firing performed on the electrode slurry is 600° C. to 950° C.; preferably, electroplating or immersion gold processing is performed on the surface of the electrodes, and insulation processing is performed on the surface of the electrodes; and preferably, silk printing or pad printing or 3D printing is performed on the ceramic back cover 1 to form the leading-out ends 5 of the wireless charging RX coil 8.

In a preferred embodiment, the wireless charging RX electrode grooves 3 and the electrode grooves 4 of the NFC antenna are etched on the inner surface of the ceramic back cover 1; preferably, an electrode slurry used for forming the electrodes includes the mass percentage of silver content 60% to 95% and glass dust content 5% to 40%; preferably, the sintering temperature of silver ink firing performed on the electrode slurry is 600° C. to 950° C.; preferably, electroplating or immersion gold processing is performed on the surface of the electrodes, and insulation processing is performed on the surface of the electrodes; and preferably, silk printing or pad printing or 3D printing is performed on the ceramic back cover to form the leading-out ends 5 of the wireless charging RX coil 8, the main antenna 6, the NFC antenna 7, and the leading-out ends of the NFC antenna 7.

In a preferred embodiment, a magnetic plate 9 covering on the wireless charging RX coil 8 is further included; and preferably, the magnetic plate 9 further covers the NFC antenna 7 disposed around the groove 2.

In another embodiment, an electronic device is included and includes the foregoing ceramic back cover 1 used in an electronic device according to any one of the foregoing embodiments.

Figure 1:
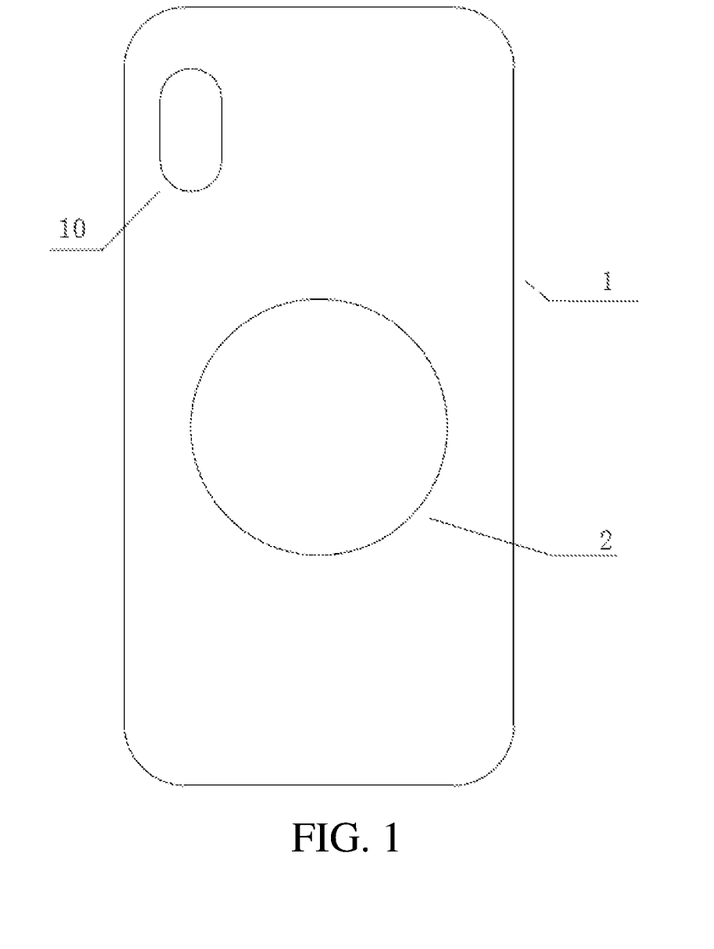
FIG. 1 is a schematic diagram of a ceramic back cover according to a specific implementation of the present disclosure.

In some embodiments, a ceramic back cover 1 that integrates a main antenna 6, an NFC antenna 7, and a wireless charging RX coil 8 is shown in FIG. 1. The thickness of the ceramic back cover 1 is 0.35 mm to 0.55 mm, a circular groove 2 or a square groove 2 or a racetrack groove 2 is in the middle of the ceramic back cover 1, and the depth of the groove 2 is 0.1 mm to 0.2 mm.

Figure 2:
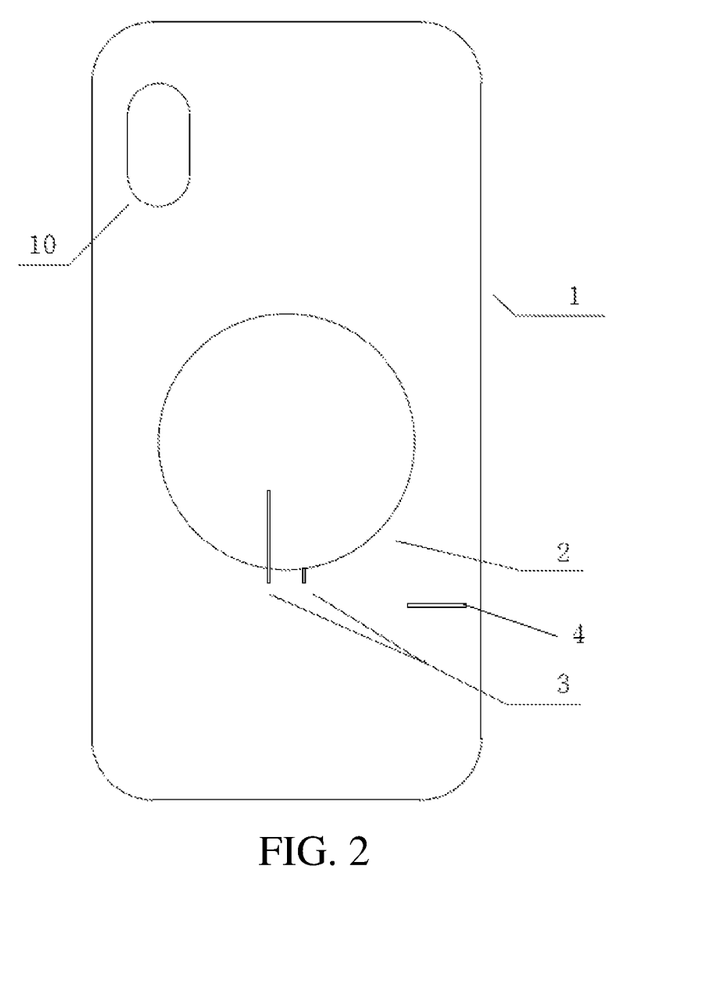
FIG. 2 is a schematic diagram of an electrode groove of a ceramic back cover according to a specific implementation of the present disclosure.

As shown in FIG. 2, the electrode grooves of the NFC antenna 7 are etched on the ceramic back cover 1 and used as leading-out ends 5 of electrodes, and the depth of the electrode grooves is 0.1 mm to 0.2 mm A wireless charging RX electrode grooves 3 is also etched on the ceramic back cover 1 and used as leading-out ends 5 of electrodes, and the depth of the electrodes groove is 0.1 mm to 0.2 mm.

The wireless charging RX coil 8 is fixed in the groove 2, and electrodes at two ends of the coil 8 are spot welded at the leading-out ends 5 of the silk printed wireless charging RX coil 8 to play a conduction role. Then, a magnetic plate is adhered to the NFC antenna 7 and the RX coil 8. In this way, not only the thickness can be reduced to help miniaturize and thin an electronic product such as a mobile phone, a tablet computer, or a wearable device, but also the wireless charging efficiency is higher when wireless charging is performed.

Figure 3:
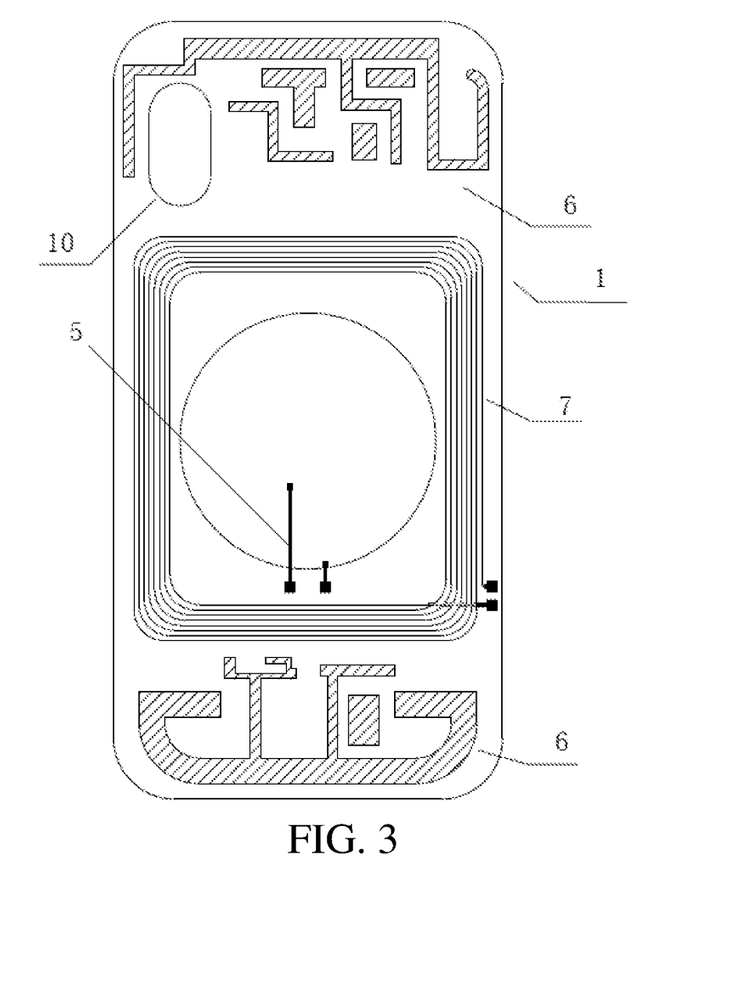
FIG. 3 is a schematic diagram of an electrode of a ceramic back cover according to a specific implementation of the present disclosure.

As shown in FIG. 3, silk printing or pad printing or 3D printing is performed on electrodes of the main antenna 6, the NFC antenna 7, and the leading-out end 5 of the wireless charging RX coil 8 on the ceramic back cover 1. The electrode slurry includes the mass percentage of silver content 60% to 95%, glass dust content 5% to 40%, and the like. After the electrode grooves are coated with the slurry, silver ink firing processing is performed on the electrode slurry at the sintering temperature of 600° C. to 950° C. After sintering is completed, electroplating or immersion gold processing is performed on the surface of the electrodes, and insulation processing is performed on the surface. In addition, "three proof processes" of mould proof, moisture proof, and salt-spray proof are performed. Not only the product can be insulated, waterproof, moisture proof, and dustproof, but also the performance of the product such as heat and cold resistance, aging resistance, radiation resistance, salt spray resistance, ozone resistance, vibration resistance, high toughness, and strong adhesion can be enhanced.

Figure 4:
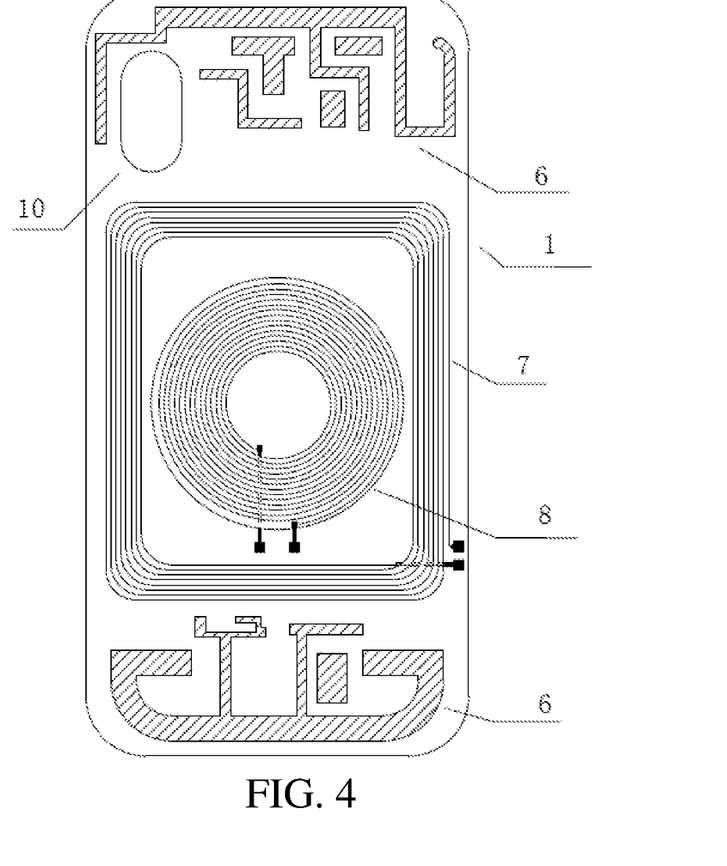
FIG. 4 is a schematic diagram of a ceramic back cover and a circular wireless charging RX coil according to a specific implementation of the present disclosure.
Figure 5:
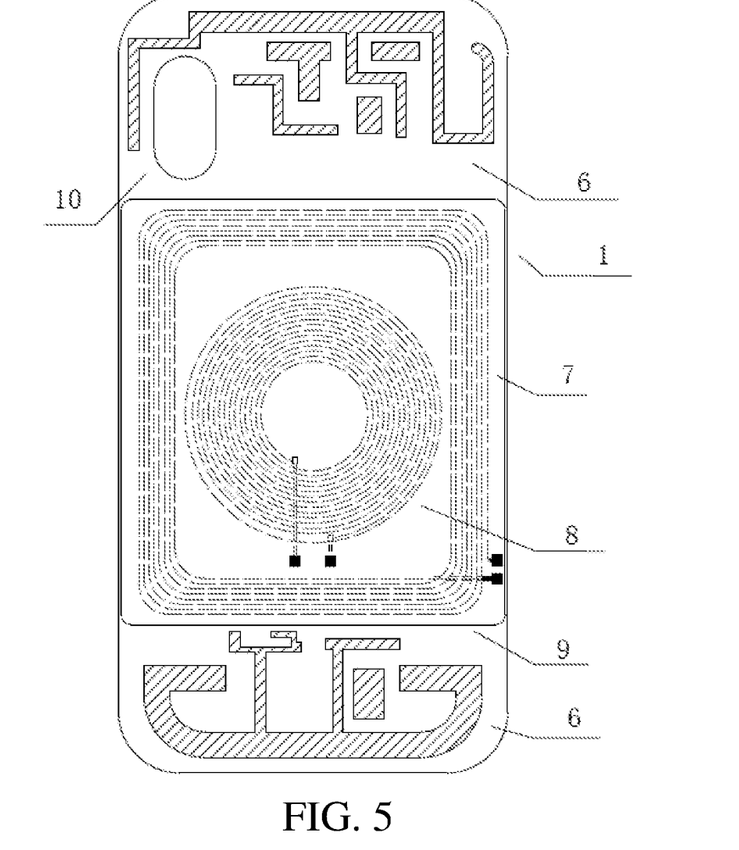
FIG. 5 is a schematic diagram of a ceramic back cover, a circular wireless charging RX coil, and a magnetic plate according to a specific implementation of the present disclosure.

Two faces of the coil 8 are coated with rubber. The rubber is of an acrylic material, and the thickness is 20 μm to 60 μm. In the groove 2 of the ceramic back cover 1 on which electroplating or immersion gold processing has been performed, the wireless charging RX coil 8 coated with rubber is placed and fixed in the groove 2, which may be implemented by using a device, or may be manually completed, as shown in FIG. 4. Two ends of the wireless charging coil 8 are spot welded at the leading-out ends 5 of the wireless charging RX coil 8 to play a conduction role. Then, the magnetic plate 9 adhesively covers the NFC antenna 7 and the wireless charging RX coil 8, as shown in FIG. 5. After the foregoing operations are completed, baking-curing is performed in a baking furnace at the temperature of 80° C. to 100° C. for 5 s to 10 s.

Figure 6:
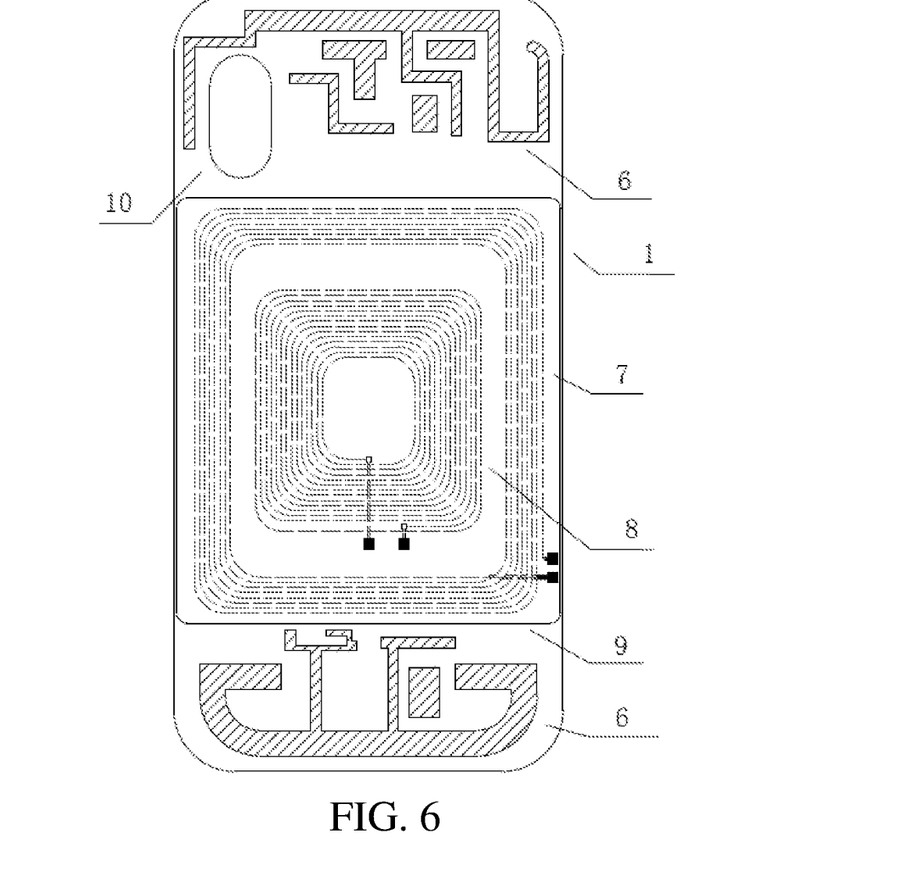
FIG. 6 is a schematic diagram of a ceramic back cover, a square wireless charging RX coil, and a magnetic plate according to a specific implementation of the present disclosure.
Figure 7:
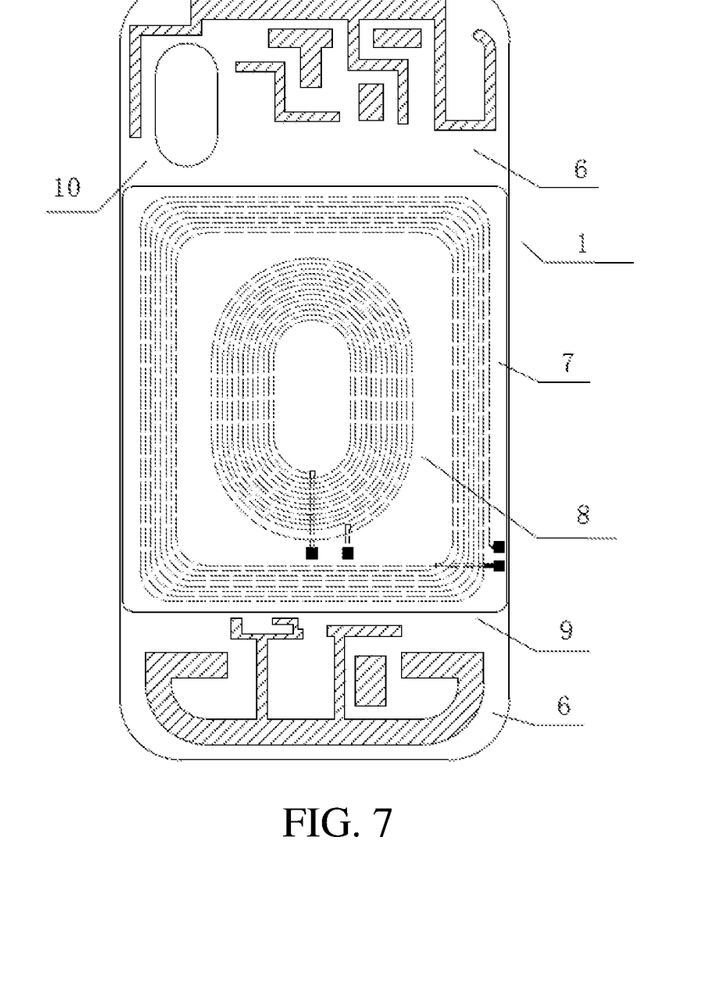
FIG. 7 is a schematic diagram of a ceramic back cover, a racetrack wireless charging RX coil, and a magnetic plate according to a specific implementation of the present disclosure.

The ceramic back cover 1 and the wireless charging RX coil 8 may be made into a square groove 2 and a square coil 8, or a racetrack groove 2 and a racetrack coil 8 according to requirements of clients, as shown in FIG. 6 and FIG. 7.

The wireless charging RX coil 8 may be made by using N-stranded wrapping wires (N>1) in a single-layer multi-stranded parallel manner or flat wire single-layer manner. The section of the wire may be circular or square.

The wire of the wireless charging coil 8 in the groove 2 does not need to be pressed on the wireless charging coil 8, and may be spot welded at the leading-out ends 5.

In the ceramic back cover 1 of the embodiments of the present invention, the body, the main antenna 6, the NFC antenna 7, and the wireless charging coil 8 of the ceramic back cover are integrated. Compared with the existing conventional structure that the wireless charging coil 8 and the magnetic plate 9 are adhered to be fixed on the back cover, the electronic device of the embodiments of the present invention has higher wireless charging efficiency.

The following uses a wireless charging RX coil 8 made of a single-layer metal wire as an example to further verify the efficiency of the wireless charging RX coil 8 in specific implementations of the present invention by using more specific instances.

Example 1

A metal wrapping wire 13 with the same wire diameter (0.10 mm) is made into a coil, and the ceramic back cover of the present invention is used in this instance. Compared with the conventional method of adhering the wireless charging RX coil and the magnetic plate to be fixed in a back cover of a battery for use, in a power output aspect, an input voltage and an output voltage are set to 12 V. When the input voltage and the output voltage are 0.1 A, the efficiency of the coil in this instance of the present invention is 58%, and the efficiency of the coil in the conventional method is 45%. When the input voltage and the output voltage are 0.5 A, the efficiency of the coil in this instance of the present invention is 81%, and the efficiency of the coil in the conventional method is 75%. When the input voltage and the output voltage are 1.0 A, the efficiency of the coil in this instance of the present invention is 86%, and the efficiency of the coil in the conventional method is 78%. It can be learned from the data that, the wireless charging efficiency of the corresponding coil in this instance of the present invention is obviously higher than that of the corresponding coil in the conventional method.

Example 2

Likewise, a metal wrapping wire 12 with the same diameter (0.10 mm) is made into a coil, and the ceramic back cover of the present invention is used in this instance. Compared with the conventional method of adhering the wireless charging RX coil and the magnetic plate to be fixed in a back cover of a battery for use, in a power output aspect, an input voltage and an output voltage are set to 12 V. When the input voltage and the output voltage are 0.1 A, the efficiency of the coil in this instance of the present invention is 54%, and the efficiency of the coil in the conventional method is 41%. When the input voltage and the output voltage are 0.5 A, the efficiency of the coil in this instance of the present invention is 78%, and the efficiency of the coil in the conventional method is 70%. When the input voltage and the output voltage are 1.0 A, the efficiency of the coil in this instance of the present invention is 82%, and the efficiency of the coil in the conventional method is 74%. It can be learned from the data that, the wireless charging efficiency of the corresponding coil in this instance of the present invention is obviously higher than that of the corresponding coil in the conventional method.

Example 3

Likewise, a metal wrapping wire 10 with the same diameter (0.10 mm) is made into a coil, and the ceramic back cover of the present invention is used in this instance. Compared with the conventional method of adhering the wireless charging RX coil and the magnetic plate to be fixed in a back cover of a battery for use, in a power output aspect, an input voltage and an output voltage are set to 12 V. When the input voltage and the output voltage are 0.1 A, the efficiency of the coil in this instance of the present invention is 50%, and the efficiency of the coil in the conventional method is 38%. When the input voltage and the output voltage are 0.5 A, the efficiency of the coil in this instance of the present invention is 72%, and the efficiency of the coil in the conventional method is 67%. When the input voltage and the output voltage are 1.0 A, the efficiency of the coil in this instance of the present invention is 78%, and the efficiency of the coil in the conventional method is 70%. It can be learned from the data that, the wireless charging efficiency of the corresponding coil in this instance of the present invention is obviously higher than that of the corresponding coil in the conventional method.

Test results of the foregoing three instances are concluded in the table as follows:

| Test project | Efficiency (%) | | | | | |
| --- | --- | --- | --- | --- | --- | --- |
| | The present invention | | | Conventional method | | |
| Instance | 0.1 A | 0.5 A | 1.0 A | 0.1 A | 0.5 A | 1.0 A |
| Instance 1 | 58% | 81% | 86% | 45% | 75% | 78% |
| Instance 2 | 54% | 78% | 82% | 41% | 70% | 74% |
| Instance 3 | 50% | 72% | 78% | 38% | 67% | 70% |

It can be learned from the test results in instances 1 to 3 that, the performance of the wireless charging RX coil prepared in the present invention is obviously better than that in the conventional method. In a condition of obtaining the same wireless charging efficiency, the coil in this specific implementation may be wrapped in fewer numbers of turns, thereby meeting miniaturization and thinning application requirements.

Although the present invention is described above in further detail through specific/preferred embodiments, the present invention is not limited to the specific embodiments. Persons of ordinary skill in the art may further make some improvements and variations without departing from the concept of the present invention, and the improvements and variations belong to the protection scope of the present invention. In the description of this application, the descriptions of the reference terms "an embodiment", "some embodiments", "preferred embodiment", "example", "specific example", or "some examples" etc., mean that specific features, structures, materials, or characteristics described with reference to the embodiments or examples are included in at least one embodiment or example of the present invention. In this specification, schematic descriptions of the foregoing terms do not need to aim at a same embodiment or example. Besides, the specific features, the structures, the materials or the characteristics that are described may be combined in a proper manner in any one or more embodiments or examples. In addition, in a case that is not mutually contradictory, persons skilled in the art can combine or group different embodiments or examples that are described in this specification and features of the different embodiments or examples. Although the embodiments and advantages of the present invention have been described, it should be understood that, various variations, replacements, and modifications may be made to this specification without departing from the spirit and scope of the embodiments limited by the appended claims. In addition, the scope of the present invention is not intended to limit the specific embodiments of the processes, machines, manufactures, substance compositions, means, methods, and steps of this specification. A person of ordinary skill in the art may easily understand that, the foregoing processes, machines, manufactures, substance compositions, means, methods, and steps that exist at present or are to be developed later and that are for executing the same basic function of the corresponding embodiment in this specification or obtaining the same basic result of the embodiments in this specification may be used. Therefore, the appended claims are intended to include the processes, machines, manufactures, substance compositions, means, methods, and steps in the scope.

What is claimed is:

1. A ceramic back cover used in an electronic device, wherein a wireless charging RX coil is disposed on an inner surface of the ceramic back cover, the inner surface of the ceramic back cover has an intermediate region, a groove used for disposing the wireless charging RX coil is in the intermediate region of the inner surface of the ceramic back cover, and at least two wireless charging RX electrode grooves that extend outward separately from an intermediate region of the groove and a marginal region of the groove are formed on the inner surface of the ceramic back cover, wherein the wireless charging RX electrode groove extending outward from the intermediate region of the groove is located below the wireless charging RX coil, wherein electrodes formed in the at least two wireless charging RX electrode grooves are used as leading-out ends of the wireless charging RX coil disposed in the groove and the leading-out end of the wireless charging RX coil extending outward from the intermediate region of the groove is located below the wireless charging RX coil, and two ends of the wireless charging RX coil are welded at the leading-out ends.

2. The ceramic back cover used in the electronic device according to claim 1, wherein a thickness of the ceramic back cover is 0.35 mm to 0.55 mm, a depth of the groove is 0.1 mm to 0.2 mm, and a depth of the wireless charging RX electrode grooves is 0.1 mm to 0.2 mm.

3. The ceramic back cover used in the electronic device according to claim 1, wherein the groove is a circular groove or a square groove or a racetrack groove.

4. The ceramic back cover used in the electronic device according to claim 1, wherein a material of the ceramic back cover is a zirconium oxide structure ceramic or an aluminum oxide structure ceramic.

5. The ceramic back cover used in the electronic device according to claim 1, wherein a main antenna and an NFC antenna of the electronic device are further disposed on the inner surface of the ceramic back cover, and at least two electrode grooves of the NFC antenna are formed on the ceramic back cover, wherein electrodes formed in the at least two electrode grooves of the NFC antenna are used as leading-out ends disposed in the NFC antenna.

6. The ceramic back cover used in the electronic device according to claim 5, wherein the NFC antenna is disposed around the groove used for disposing the wireless charging RX coil.

7. The ceramic back cover used in the electronic device according to claim 5, wherein the wireless charging RX electrode grooves and the electrode grooves of the NFC antenna are etched on the inner surface of the ceramic back cover.

8. The ceramic back cover used in the electronic device according to claim 1, wherein the wireless charging RX electrode grooves are etched on the inner surface of the ceramic back cover.

9. The ceramic back cover used in the electronic device according to claim 1, further comprising a magnetic plate covering the wireless charging RX coil.

10. An electronic device, comprising the ceramic back cover used in the electronic device according to claim 1.

* * * * *